United States Patent [19]

Plotzker et al.

[11] Patent Number: 5,688,895
[45] Date of Patent: Nov. 18, 1997

US005688895A

[54] LIQUID CRYSTALLINE POLY(ESTER-AMIDES)

[75] Inventors: Irene Greenwald Plotzker; Joel David Citron, both of Wilmington; Marion Glen Waggoner, Hockessin, all of Del.

[73] Assignee: E. I. Du Pont de Nemours and Company, Wilmington, Del.

[21] Appl. No.: 668,761

[22] Filed: Jun. 24, 1996

[51] Int. Cl.$^6$ .................................. C08G 63/00
[52] U.S. Cl. .................... 528/183; 528/176; 528/183; 528/185; 528/190; 528/193; 528/194; 528/335; 528/344; 528/361
[58] Field of Search .................. 528/176, 183, 528/185, 190, 193, 194, 335, 344, 361; 525/444

[56] References Cited

U.S. PATENT DOCUMENTS

| | | | |
|---|---|---|---|
| 4,895,922 | 1/1990 | Ogata | 528/179 |
| 5,162,484 | 11/1992 | Judas | 528/183 |

FOREIGN PATENT DOCUMENTS 0 372 627  6/1990  European Pat. Off. .

*Primary Examiner*—Samuel A. Acquah
*Attorney, Agent, or Firm*—James A. Forstner

[57] ABSTRACT

Disclosed herein are thermotropic liquid crystalline poly (ester-amides) containing repeat units derived from alipatic diamines and other monomers, such as aromatic diols, aromatic dicarboxylic acids, aromatic hydroxycarboxylic acids, and optionally aliphatic diols. The polymers are particularly useful as films and in multilayer structures as barrier layers because of their relatively low permeability to various compounds.

20 Claims, No Drawings

LIQUID CRYSTALLINE POLY(ESTER-AMIDES)

FIELD OF THE INVENTION

This invention concerns a novel thermotropic liquid crystalline poly(ester-amide) which contains repeat units derived from an aliphatic diamine. These polymers are useful as molding resins and as films.

TECHNICAL BACKGROUND

Thermotropic liquid crystalline polymers ("LCPs") are useful in many applications, for examples as molding resins in electrical connectors, automotive parts, and intricate parts which are difficult to mold using isotropic polymers. They are also useful as films and as barrier layers since they usually have low permeability to many compounds. Such polymers with improved properties and/or lower cost are thus desired.

U.S. Pat. No. 5,162,484 describes a thermotropic liquid crystalline poly(ester-amide) made from an aliphatic aminoacid. No mention is made of polymers of the type described herein.

European Patent Application 372,627 describes a thermotropic liquid crystalline poly(ester-amide) made by reaction of an aliphatic polyamide and an aromatic hydroxycarboxylic acid or aromatic aminocarboxylic acid. No mention is made of polymers of the type described herein.

SUMMARY OF THE INVENTION

This invention concerns a liquid crystalline poly(ester-amide) consisting essentially of the repeat units:

(i) 100 molar parts, total of 10 m 50 molar parts of $-R^1NR^2NR^1-$ (I), and 50 m 90 molar parts $-OAr^1O-$ (II);

(ii) 100 molar parts of $-(O)CAr^2C(O)-$ (III);

(iii) 50 m 200 molar parts of $-OAr^3C(O)-$ (IV); and (iv) 0 to 100 molar parts of $-OR^3O(O)CAr^4C(O)-$ (V); wherein:

each $R^1$ is independently hydrogen or alkyl;

$R^2$ is alkylene or substituted alkylene, each containing 4 to 16 carbon atoms;

$R^3$ is $-(CH_2)_n-$ wherein n is 2 m 6; and each of $Ar^1$, $Ar^2$, $Ar^3$ and $Ar^4$ is independently arylene.

This invention also concerns a process for the preparation of a liquid crystalline poly(ester-amide) in which at least some of the repeat units are derived from aliphatic diamines and at least some of the repeat units are derived from aromatic diols, and wherein said aromatic diols are polymerized in the form of their esters with aliphatic acids, wherein the improvement comprises adding said aliphatic diamine to a polymerization vessel in the form of a solid derivative of the aliphatic diamine, which derivative is itself either (1) polymerizable, or (2) is converted in said polymerization vessel to a polymerizable compound.

In the claims and elsewhere, the term "independently" is used to refer to substituents which may either be entirely one of the indicated moieties, or a mixture of the indicated moieties.

DETAILS OF THE INVENTION

The compounds or repeat units described herein have certain groupings which are defined as follows. By an arylene group is meant a group that contains at least one aromatic carbocyclic ring and two free valencies to different carbon atoms of one or more aromatic rings. This group may contain one or more aromatic rings, and if more than one such ring is present they may be fused, as in naphthalene, connected by a covalent bond, as in biphenyl, or by a divalent group, as in diphenyl ether. There may also be inert groups attached to the aromatic ring(s), such as one or more alkyl groups. It is preferred that arylene groups contain 6 to 20 carbon atoms.

By alkylene is meant a divalent alkane grouping which contains two free valencies to the same or different carbon atoms. By substituted alkylene is meant that the alkylene group may contain substituents which do not interfere with the polymerization reaction or the stability of the starting materials. Suitable substituents include ether and aryl. Alkyl groups are given their usual meaning, and unless otherwise specified herein, it is preferred that they contain 1 to 20 carbon atoms.

Repeat unit (I) is formally derived from an aliphatic dime, repeat unit (II) is formally derived by an aromatic diol, repeat unit (III) is formally derived from an aromatic dicarboxylic acid, repeat unit (IV) is formally derived from an aromatic hydroxycarboxylic acid, and repeat unit (V), where present, is formally derived from a polyester derived from an aromatic dicarboxylic acid and an aliphatic diol. "Formally derived" means that the unit is clearly a repeat unit derivable from the specified monomer, but the repeat unit in the polymer itself may or may not have actually been made from that monomer. Normally the repeat unit will be made from that monomer or a readily reactive (in the polymerization) derivative thereof.

It is preferred that both of $R^1$ are hydrogen.

It is preferred that $R^2$ is $-(CH_2)_m-$ wherein m is 4 to 16, and/or $-CH_2CH(CH_3)CH_2CH_2CH_2-$, and more preferably $R^2$ is $-(CH_2)_m-$ wherein m is 6 and/or $-CH_2CH(CH_3)CH_2CH_2CH_2-$.

Groups suitable for $Ar^1$ are one or more of m-phenylene, p-phenylene, 4,4'-biphenylylene, 2-methyl-1,4-phenylene, 2-chloro-1,4-phenylene, 2-t-butyl-1,4-phenylene, 2-phenyl-1,4-phenylene, 2,6-naphthylylene, 2,7-naphthylylene, and 1,4-naphthylylene. Preferred $Ar^1$ groups are one or both of p-phenylene and 4,4'-biphenylylene. When both of these groups are present as $Ar^1$, it is preferred that of the 100 total molar parts present, 20–80 are 4,4'-biphenylylene and 20–80 are p-phenylene.

Groups suitable for $Ar^2$ are one or more of m-phenylene, p-phenylene, 4,4'-biphenylylene, 2-chloro-1,4-phenylene, 2,6-naphthylylene, 2,7-naphthylylene, and 1,4-naphthylylene. Preferred $Ar^2$ groups are one or both of p-phenylene and 2,6-naphthylylene. When both of these groups are present as $Ar^2$, it is preferred that of the 100 total molar parts present, 30–80 are 2,6-naphthylylene and 20–70 are p-phenylene.

Groups suitable for $Ar^3$ are one or more of m-phenylene, p-phenylene, 4,4'-biphenylylene, 2-methyl-1,4-phenylene, 2-chloro-1,4-phenylene, 2-t-butyl-1,4-phenylene, 2-phenyl-1,4-phenylene, 2,6-naphthylylene, 2,7-naphthylylene, and 1,4-naphthylylene. Preferred $Ar^3$ groups are one or both of p-phenylene and 2,6-naphthylylene, and p-phenylene is more preferred.

Groups suitable for $Ar^4$ are one or more of m-phenylene, p-phenylene, 4,4'-biphenylylene, and 2,6-naphthylylene. Preferred $Ar^4$ groups are one or both of p-phenylene and 2,6-naphthylylene, and p-phenylene is more preferred.

It is preferred that in $R^3$ n is 2 or 4, more preferably 2. It is preferred that 20–60 molar parts of (V) be present in the polymer.

These polymers are useful as molding resins, in films, and as layers in multilayer structures containing two or more polymer layers. These polymers are especially useful in films or multilayer structures because of their low permeability to water and oxygen. This makes them particularly useful in packaging films and in containers, such as bottles. Some water and oxygen permeability values are given in the Examples. The melting points of the polymers may be readily varied by changing the proportion of ingredients, as illustrated in Examples. This is particularly important when blends or multilayer structures are made with other polymers, so the processing temperature of the various polymers can be matched.

The poly(ester-amides) described herein can be made by methods well known to the artisan, particularly those methods that are useful in making fully aromatic polyesters or poly(ester-amides). One method of making fully aromatic polyesters or poly(ester-amides) is to polymerize all of the hydroxy groups in the monomers in the form of alkyl ester, preferably lower (up to 6 carbon atoms, and most preferably as acetates) alkyl esters. The amino groups in the polymerization may be present as simple amino groups or N-arylalkyl amides. They could be added as the parent hydroxyl and amino compounds or their respective esters or amides, or the amino and hydroxyl groups can be converted in the polymerization vessel to their respective esters and amides by reaction with an appropriate amount of alkyl carboxylic anhydride, such as acetic anhydride.

Similar methods can be used herein when a repeat unit is derived from an aliphatic dime. However, most aliphatic dimes useful herein are liquids or have low melting solids, and are usually more volatile than most monomers used to make thermotropic liquid crystalline polymers, such as aromatic polyesters or poly(ester-amides). In addition these aliphatic dimes are often toxic and/or corrosive, making them difficult to handle in a safe manner, particularly in an existing plant for making thermotropic LCPs. It is therefore beneficial to add these dimes to the polymerization vessel in a solid (at ambient temperature, and preferably at 50° C.), relatively nonvolatile form which may be readily polymerized itself, or easily converted in the polymerization reactor to an easily polymerized form. By a polymerization vessel herein is meant a single vessel or one of a series of vessels in which the polymerization and any preliminary reactions needed to achieve polymerization (such as esterification of aromatic hydroxyl groups with a carboxylic anhydride) take place.

Such forms or derivatives of aliphatic diamines which may be used include the mono- and diamides, preferably the diamide, from the aliphatic diamine and aliphatic carboxylic acids (or reactive derivatives thereof), which are directly polymerizable, and the carbamates of these diamines which when heated decompose to the parent aliphatic diamines. Also, the aliphatic diamine may be added in the form of a polyamide, wherein the dicarboxylic acid of the polyamide is meant to be part of the resulting LCP, such as in repeat unit (III). If sufficient carboxylic anhydride such as acetic anhydride is present in the polymerization reactor, any "free" formed (as from a carbamate) aliphatic diamine will be converted to the diamide, which can take part in the polymerization, or the aliphatic diamine itself may take part in the polymerization.

In a preferred embodiment of this type of polymerization process, all of the monomers needed for the polymerization, including any or all of monomers such as $HOAr^1OH$, $H(O)CAr^2C(O)H$, $HOAr^3C(O)H$, and the polymer —$[OR^3O(O)CAr^4C(O)]_x$—, are added to a polymerization vessel, and the aliphatic diamine is added as a solid derivative which may readily polymerize or be converted to a polymerizable compound. A sufficient amount of a carboxylic acid anhydride, such as acetic anhydride, to acetylate all of the hydroxyl groups present, and if not already in the amide form, the diamine, is also added. The order of addition is not critical. The reactor contents are then heated to cause the acetylation to take place, the byproduct acetic acid distilled off, farther heated (usually at higher temperature) to cause the condensation reaction to take place with production of byproduct acetic acid which is removed by distillation, and then usually vacuum is applied at high temperature to bring the polymer up to a useful molecular weight. These heating, distillation and vacuum steps are conventional for polymerizations to form aromatic polyesters.

Abbreviations for the various monomers used in the Examples are as follows:
"HQ"=hydroquinone
"BP"=4,4'-biphenol
"TPA"=terephthalic acid
"NPA"=2,6-naphthalene dicarboxylic acid
"HBA"=4-hydroxybenzoic acid, (which contained 1,0001, 600 ppm potassium)
"HNA"=6-hydroxy-2-naphthoic acid
"HMD"=1,6-diaminohexane
"PET"=poly(ethylene terephthalate)
"PEN"=poly(ethylene 2,6-napthalenedioate)

Melting points (Tm) and glass transition temperatures (Tg) were determined by ASTM D3418-82, at a heating rate of 25° C./min. Tm was measured on the as-made polymer (first heat). The Tg was taken as the midpoint of the transition.

EXAMPLES 1–9

Preparation of the LCP

The LCPs in the Examples below were prepared as described below, wherein the values for temperature (X1) and time (X2 and X3) are provided in Table 1, below, and wherein the relative molar amounts of reactants, are provided in Table 2, below. In each instance approximately 850 g of LCP was the theoretical yield. The reactants were charged, in a nitrogen atmosphere, into a reaction vessel equipped with a Vigreaux column, condenser, and a stirrer (stir speed set at 125 RPM). Acetic anhydride was present in all polymerizations in a molar excess based on hydroxyl and amino groups present shown in Table 1.

The resultant reaction mixture was heated to reflux. Reflux began at a pot temperature of approximately 170° C. The reaction mixture was refluxed about 40 min, at constant temperature. During the next 4 h, ±30 min, the pot temperature was slowly raised to about X1, during which time acetic acid byproduct was removed. Pressure was then reduced over the next approximately X2 min to about 133 Pa (abs), while the stirrer speed was reduced to 30 RPM. The polymerization was terminated approximately X3 hours after charging of the ingredients. The resultant product was removed from the reaction vessel with a scooping tool, rapidly cooled to room temperature, and ground.

RESULTS

The LCPs were tested for glass transition temperature (Tg) and melting point (Tin) on the as made polymer. The results are provided in Table 2, below.

Films were made by extrusion using s twin screw extruder and a film die, typically having a 0.38 mm gap, a quench roll, a vacuum port on the front barrel section, and sometimes a 150 or 200 mesh screen pack, with barrel, adapter and die temperatures settings of 260°–290° C., depending on the polymer, or by pressing in a compression press to give films typically 0.05 to 0.13 mm thick. Films made in a compression press were pressed between DuPont Kapton® polyimide film at 250° C. Resulting film thickness depended upon the pressure used, and the mount of time pressure was applied. These films were tested for oxygen permeability by ASTM D3985 and/or for water permeability by ASTM F1249, and the results are shown in Table 3.

Polymer of the same composition as that of Example 3, but from a different batch, was molded into test bars on a 43 g injection molding machine with a barrel temperature of 300° C. and a mold temperature of 100° C. Tensile properties (measured by ASTM D638) were strength at break 76.5 MPa, strain at break 3.24%. Flexural properties (measured by ASTM D790), strength at break 124 MPa, modulus 6.6 GPa. A film of this composition 0.0059 mm thick had tensile properties in the machine (extrusion) direction of strength at break 263 MPa, strain at break 2.4% and modulus of 14.2 GPa, while in the transverse (perpendicular to the extrusion) direction is had a breaking strength of 27.6 MPa, a strain at break of 9.0%, and a modulus of 1.2 GPa.

TABLE 1

| Ex. No. | ppm K$^+$ in HBA | X1 (°C.) | X2 (MIN) | X3 (HR) |
| --- | --- | --- | --- | --- |
| 1 | <20 | 310 | 115 | 6.8 |
| 2 | <20 | 310 | 125 | 7.0 |
| 3 | 740 | 280 | 125 | 7.2 |
| 4 | 890 | 290 | 140 | 7.7 |
| 5 | 910 | 295 | 85 | 6.2 |
| 6 | 780 | 315 | 70 | 5.7 |
| 7 | 770 | 310 | 75 | 6.2 |
| 8 | 1090 | 280 | 175 | 9.9 |
| 9 | 890 | 280 | 125 | 8.1 |

TABLE 2[a]

| Ex. No. | BP | HQ | HMD | T | NPA | HBA | HNA | PET | PEN | Tm | Tg |
| --- | --- | --- | --- | --- | --- | --- | --- | --- | --- | --- | --- |
| 1.0 | 26.3 | 26.3 | 47.4 | 36.8 | 63.2 | 89.5 | 38.8 | 0.0 | 0.0 | 265 | 119 |
| 2.0 | 29.5 | 29.5 | 41.0 | 41.0 | 59.0 | 100.3 | 29.5 | 0.0 | 0.0 | 141[c], 294 | 126[c] |
| 3.0 | 29.4 | 29.4 | 41.2 | 41.2 | 58.8 | 100.0 | 0.0 | 47.1 | 0.0 | 232 | 103 |
| 4.0 | 35.5 | 35.5 | 29.0[b] | 40.0 | 60.0 | 100.0 | 0.0 | 0.0 | 0.0 | 220[c], 270[c] | 126 |
| 5.0 | 15.0 | 56.0 | 29.0 | 25.0 | 75.0 | 100.0 | 0.0 | 0.0 | 0.0 | 244 | 121 |
| 6.0 | 42.5 | 42.5 | 15.0 | 47.0 | 53.0 | 100.0 | 0.0 | 30.0 | 0.0 | 188[c] | 104 |
| 7.0 | 29.4 | 29.4 | 41.2 | 41.2 | 58.8 | 100.0 | 0.0 | 0.0 | 29.4 | 205[c], 232, 275 | 109 |
| 8.0 | 35.5 | 35.5 | 29.0 | 60.0 | 40.0 | 100.0 | 0.0 | 0.0 | 0.0 | 255 | 124[c] |
| 9.0 | 35.5 | 35.5 | 29.0 | 40.0 | 60.0 | 100.0 | 0.0 | 0.0 | 0.0 | 220 | — |

[a]All amounts in molar parts, except Tg and Tm in °C.
[b]This is 2-methyl-1,5-pentanediamine.
[c]Small or otherwise questionable transitions.

TABLE 3

| Ex. No. | Film Prep.[a] | OPV[b] | WVTR[c] |
| --- | --- | --- | --- |
| 1 | C | 0.073 | 0.069 |
| 2 | C | 0.049 | — |
| 3 | C | 0.31 | 0.11 |
| 4 | C | 0.18 | — |
| 5 | P | 0.10 | 0.12 |
|   | C | 0.15 | — |
| 6 | P | 0.13, 0.12 | — |
| 7 | C | 0.28 | 0.083 |
| 8 | C | 0.11, 0.24 | — |
| 9 | C | 0.19 | 0.054 |

[a]Film preparation, C = cast, P = pressed.
[b]Oxygen permeation value at 30° C., 50% relative humidity, in cc-mil/100 in2/24 h.
[c]Water vapor transmission rate at 37.8° C., 100% relative humidity, in g-mil/100 in2/24 h.

EXAMPLE 10

In a procedure similar to that of Examples 1–9, a composition similar to that of Example 1 was made, except that the 1,6-diaminohexane was added as its carbamate, available as DIAK®#1 from E. I. du Pont de Nemours and Company, Wilmington, Del., U.S.A. X1 was 310° C., X2 was 62 min., and X3 was 5.8 h. The resulting polymer had a Tm of 262° C. and a Tg of 124° C.

What is claimed is:

1. A liquid crystalline poly(ester-amide) consisting essentially of the repeat units:

(i) 100 molar parts, total, of 10 to 50 molar parts of —R$^1$NR$^2$NR$^1$— (I), and 50 to 90 molar parts —OAr$^1$O— (II);

(ii) 100 molar parts of —(O)CAr$^2$C(O)— (III);

(iii) 50 to 200 molar parts of —OAr$^3$C(O)— (IV); and (iv) 0 to 100 molar parts of —OR$^3$O(O)CAr$^4$C(O)— (V);

wherein:

each R$^1$ is independently hydrogen or alkyl;

R$^2$ is alkylene or substituted alkylene, each containing 4 to 16 carbon atoms;

R$^3$ is —(CH$_2$)$_n$— wherein n is 2 to 6; and each of Ar$^1$, Ar$^2$, Ar$^3$ and Ar$^4$ is independently arylene.

2. The liquid crystalline poly(ester-amide) of claim 1 wherein both of R$^1$ are hydrogen.

3. The liquid crystalline poly(ester-amide) of claim 1 wherein R$^2$ is —(CH$_2$)$_m$— wherein m is 4 to 16; or —CH$_2$CH(CH$_3$)CH$_2$CH$_2$CH$_2$—.

4. The liquid crystalline poly(ester-amide) of claim 1 wherein R$^2$ is —(CH$_2$)$_m$— wherein m is 6; or —CH$_2$CH(CH$_3$)CH$_2$CH$_2$CH$_2$—.

5. The liquid crystalline poly(ester-amide) of claim 1 wherein Ar$^1$ is one or both of p-phenylene and 4,4'-biphenylylene.

6. The liquid crystalline poly(ester-amide) of claim 5 wherein of a total of 100 molar parts of said p-phenylene and said 4,4'-biphenylylene, said p-phenylene is 20–80 molar parts and said 4,4'-biphenylylene is 80–20 molar parts.

7. The liquid crystalline poly(ester-amide) of claim 1 wherein $Ar^2$ is one or both of p-phenylene and 2,6-naphthylylene.

8. The liquid crystalline poly(ester-amide) of claim 7 wherein of a total of 100 molar parts of said p-phenylene and said 2,6-naphthylylene, said p-phenylene is 20–70 molar parts and said 2,6-naphthylylene is 30–80 molar parts.

9. The liquid crystalline poly(ester-amide) of claim 1 wherein $Ar^3$ is one or both of p-phenylene and 2,6-naphthylylene.

10. The liquid crystalline poly(ester-amide) of claim 1 wherein $Ar^3$ is p-phenylene.

11. The liquid crystalline poly(ester-amide) of claim 1 wherein $Ar^4$ is one or both of p-phenylene and 2,6-naphthylylene, and n is 2.

12. The liquid crystalline poly(ester-amide) mixtures of claim 1 wherein both of $R^1$ are hydrogen; $R^2$ is —$(CH_2)_m$— wherein m is 6 or —$CH_2CH(CH_3)CH_2CH_2CH_2$—; $Ar^1$ is one or both of p-phenylene and 4,4'-biphenylylene; $Ar^2$ is one or both of p-phenylene and 2,6-naphthylylene; $Ar^3$ is one or both of p-phenylene and 2,6-naphthylylene; and $Ar^4$ is one or both of p-phenylene and 2,6-naphthylylene, and n is 2.

13. The liquid crystalline poly(ester-amide) of claim 12 wherein $Ar^3$ is p-phenylene.

14. The liquid crystalline poly(ester-amide) of claim 1 wherein 20 to about 60 molar parts of (V) are present.

15. In a process for the preparation of a liquid crystalline poly(ester-amide) comprising repeat units at least some of which are derived from aliphatic diamines and at least some of which are derived from aromatic diols, and wherein said aromatic diols are polymerized in the form of their esters with aliphatic acids, an improvement comprising adding said aliphatic diamine to a polymerization vessel in the form of a solid derivative thereof which derivative is itself either polymerizable, or is converted in said polymerization vessel to a polymerizable compound.

16. The process of claim 15 wherein said solid derivative is a carbamate or a mono- or diamide.

17. The process of claim 15 wherein said solid derivative is a carbamate.

18. The process of claim 15 wherein said solid derivative is a diamide.

19. The process of claim 15 wherein an aliphatic carboxylic anhydride is also added.

20. The process of claim 15 wherein said solid derivative is a polyamide.

* * * * *